United States Patent
Moore et al.

(10) Patent No.: US 11,487,017 B2
(45) Date of Patent: Nov. 1, 2022

(54) DRONE DETECTION USING MULTI-SENSORY ARRAYS

(71) Applicant: Alberta Centre for Advanced MNT Products, Edmonton (CA)

(72) Inventors: Brian Moore, Edmonton (CA); Ken Brizel, Edmonton (CA)

( * ) Notice: Subject to any disclaimer, the term of this patent is extended or adjusted under 35 U.S.C. 154(b) by 366 days.

(21) Appl. No.: 16/826,845

(22) Filed: Mar. 23, 2020

(65) Prior Publication Data

US 2020/0379124 A1 Dec. 3, 2020

Related U.S. Application Data

(60) Provisional application No. 62/821,871, filed on Mar. 21, 2019.

(51) Int. Cl.
*G01S 19/26* (2010.01)
*G01S 19/25* (2010.01)
*B64C 39/02* (2006.01)

(52) U.S. Cl.
CPC ............ *G01S 19/26* (2013.01); *B64C 39/024* (2013.01); *G01S 19/254* (2013.01); *B64C 2201/00* (2013.01)

(58) Field of Classification Search
CPC .......... G01S 19/26; G01S 19/254; G01S 5/01; G01S 5/0269
USPC ........................................................ 701/469
See application file for complete search history.

(56) References Cited

U.S. PATENT DOCUMENTS

| | | | |
|---|---|---|---|
| 4,825,223 | A | 4/1989 | Moore |
| 9,651,649 | B1 | 5/2017 | Salloum et al. |
| 10,084,960 | B2 | 9/2018 | Pettegrew et al. |
| 10,101,196 | B2 | 10/2018 | Naguib et al. |
| 10,236,018 | B2 | 3/2019 | Moore et al. |
| 2017/0148467 | A1 | 5/2017 | Franklin et al. |

(Continued)

FOREIGN PATENT DOCUMENTS

WO WO-2016184563 A1 * 11/2016 ........... B64C 39/024

OTHER PUBLICATIONS

I.A. McCowan, Robust Speech Recognition using Microphone Arrays, PhD Thesis, Queensland University of Technology, 2001, Australia.

(Continued)

*Primary Examiner* — Harry K Liu
(74) *Attorney, Agent, or Firm* — Bennett Jones LLP (57) ABSTRACT

A system and method for detection of an aerial drone in an environment includes a baseline of geo-mapped sensor data in a temporal and location indexed database formed by (i) using at least one sensor to receive signals from the environment and converting into digital signals for further processing; (ii) deriving time delays, object signatures, Doppler shifts, reflectivity, and/or optical characteristics from the received signals; (iii) geo-mapping the environment using GNSS and the sensor data; and (iv) logging sensor data over a time interval, for example 24 hours to 7 days. Live sensor data can be then be monitored and signature data can be derived by computing at least one parameter such as direction and signal strength. The live data is continuously or periodically compared to the baseline data to identify a variance, if any, which may be indicative of a detection event.

9 Claims, 7 Drawing Sheets

(56) References Cited

U.S. PATENT DOCUMENTS

2018/0261237 A1    9/2018   Moore et al.
2019/0212414 A1    7/2019   Esfahany et al.

OTHER PUBLICATIONS

R.E. Clapp, A Resistively Loaded, Printed Circuit, Electrically Short Dipole Element for Wideband Array Applications, Proceedings of IEEE Antennas and Propagation Society International Symposium, 1993, pp. 478-481, vol. 1, IEEE, Ann Arbor, MI, USA.
M.C.E. Stieber, Radio Direction Finding Network Receiver Design for Low-cost Public Service Applications, Master's Thesis, California Polytechnic State University, San Luis Obispo, 2012, USA.

* cited by examiner

DRONE DETECTION USING MULTI-SENSORY ARRAYS

FIELD OF THE INVENTION

The present invention relates to a system and method for detecting and/or locating airborne drones.

BACKGROUND

The presence and location of aerial drones cannot typically be known with any precision and in many instances their presence is not detected. Most drone incidents go undetected which means that actionable security or mitigation activities are not initiated, with potentially disastrous results. There are economic and security needs which can be helped by timely and accurate drone detection. False detection may be very costly; for example in the case of an airport where flights are canceled or delayed upon a detection incident. Drone detection currently depends on human reporting at facilities such as airports, or visual or auditory detection around the periphery of facilities.

Upgrading or adding new sensors to existing facilities to detect drones would have to account for many factors. Each individual sensor may not be able to detect drones under various circumstances. Weather, visibility, clutter, external noise such as in the form of RF or acoustical energy can interfere with detection. Zones of acceptance and exclusion are not easily determined. It is not feasible and dangerous to have active drone detection using continuous radar around airports for example. Coverage is limited and false positives are an expensive nuisance if simple sensors are deployed.

The detection of drones is vital for security and safety. The areas of application for drone detection go from security around airports to government and industrial facilities to ports and public and private facilities. There is a need in the art for more coverage and better detection, preferably in an automated manner.

SUMMARY OF THE INVENTION

In general terms, the invention may provide a system and method for detection and/or location of a drone. Examples of the invention may enable provide early detection in terms of time and distance, and/or validation with a lowered rate of false positives. In one embodiment, the system comprises at least two different sensors, each based on a different physical principle, integrated into a combined sensor array, and a computational system for processing signals received from the two different sensors and for comparing signals received with a baseline to determine if a deviance exists. In a preferred embodiment, the at least two different sensors comprises an Electromagnetic sensor, an Acoustical sensor, and/or an Optical sensor, and preferably all three. This enables sensor fusion on a single platform.

This system can be ground based and placed around facilities, such as airports to provide drone detection. The system can also attached to mobile devices such as autonomous or manned vehicles.

In one aspect, the system comprises systems and methods for creating a real time digital map, in three-dimensions, of aerial drones operating in a defined area, using a multi-sensor array. Prior art techniques are limited in resolution, accuracy, and utility. In preferred embodiments, locations are mapped and then geo-located (absolute location) using signal processing and geometric relationships between the sensor head using satellite navigation (GNSS) methods and equipment.

In one aspect, the invention may comprise a method for detection of an aerial drone in an environment, the method comprising the steps of:
(a) building a baseline of geo-mapped sensor data in a temporal and location indexed database by:
   (i) using at least one sensor to receive signals from the environment and converting into digital signals for further processing;
   (ii) deriving time delays, object signatures, Doppler shifts, reflectivity, and optical characteristics from the received signals;
   (iii) geo-mapping the environment using GNSS and sensor data; and
   (iv) logging sensor data over a time interval, for example 24 hours to 7 days;
(b) gathering live sensor data and computing at least one parameter such as direction and signal strength and derive appropriate signature data;
(c) comparing the live processed data to the baseline data to identify a variance, if any;
(d) identifying and/or locating a drone if the variance is greater than a per-determined threshold.

The identification and location of a drone may trigger notifications and alarms as configured by the system. For example, an alarm may be triggered with the local civil or military authorities.

In preferred embodiments, the signal processing transducers may be used to produce highly resolved angular resolution of signals. Phased array and digital signal processing may be used to resolve angular dependency of sensor signals. A Machine learning/AI method for the determination where a set of known signal signatures may be used to train an Artificial Intelligence algorithm or Neural Network. AI may be used to highlight sensor data and signal parameters for comparison against baseline signals.

In preferred embodiments, the method may comprise a computational step for the enhancement of signals using correlation between sensor platforms of disparate geographic location. The computational step may be used to enhance signals using a hierarchy of detection combined with historical sensor data or a priori or empirically derived detection thresholds.

In preferred embodiments, the method may comprise a step of rank ordering disparate sensor types and modalities for enhanced system utilization.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

FIG. 2 shows some sensor elements as receive only (passive) sensors. Also shown are bidirectional and transmit elements which are used as active sensors for which energy is sent from the array. Also shown is an electronics control box which contains processing memory and control electronics for the sensor array. Shown is an antenna for communications external to the sensor array. Also shown is a solar panel to provide power for a remote location.

DETAILED DESCRIPTION OF PREFERRED EMBODIMENTS

The invention comprises a system and a method for detecting and/or locating aerial drones, using a multi-sensor array and system.

In one aspect, the invention comprises a system comprising multiple sensors and signal processing to identify and/or locate aerial drones (11). As used herein, a "drone" or an "aerial drone" is an unmanned aerial vehicle. Drones may range in size from small hand-held devices readily available to consumers, to larger vehicles comparable in size to smaller manned or piloted aircraft. The drone itself is not an element of this invention.

In one embodiment, the system (12) may be fixed in location or mounted to manned or unmanned mobile equipment (13), which may itself be a drone. While each of an electro-Magnetic (EM) sensor, an Acoustical (Sound) sensor, and a light (image) sensor have impairments limiting their usefulness, the present invention combines these and/or other sensors in a novel manner.

Figure 1:
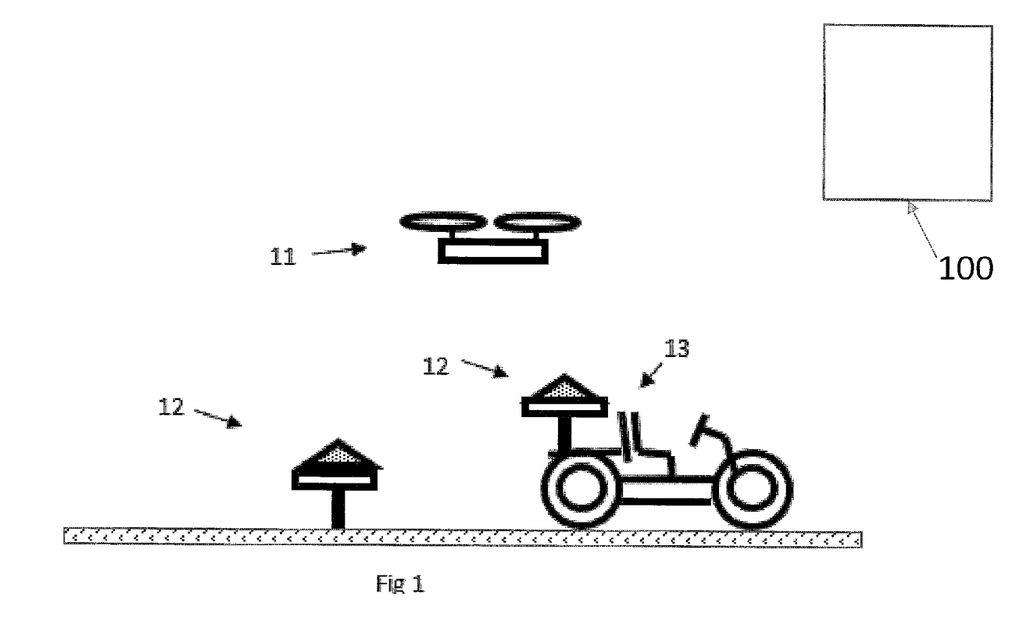
FIG. 1 shows a fixed platform and signal processing sensor array on a post. Also shown is a vehicle which is mounted with the sensor array and companion computational box. A GNSS system geolocates the sensor array either in the fixed or mobile case. RF communications is used to create a sensor network.

In one embodiment, the system comprises at least one sensor array, and preferably multiple sensor arrays, where each sensor array comprises at least two sensors of different types. FIG. 1 shows a fixed platform (11) with a sensor array and signal processing on a mounting post, as well as a vehicle-mounted sensor array (12) and companion signal processing box. The system also comprises a Global Navigation Satellite System (GNSS) module and a communication module. The GNSS module is operative to geo-locate each sensor array, whether in the fixed or mobile case. The communications module, which may be an RF communications module for example, is used to network the sensor arrays together, to communicate to command and control units and/or actors, and/or communicate with central computational or cloud based data and computing elements. The platforms can be used create a mesh network of microcells doing sensor detection and fusion, sending data back to a control group for disposition of the information. These platforms and microcells can be placed on rooftops and on buildings, fences etc., using such network communications such as cellular networks (eg. 4G or 5G).

Figure 2:
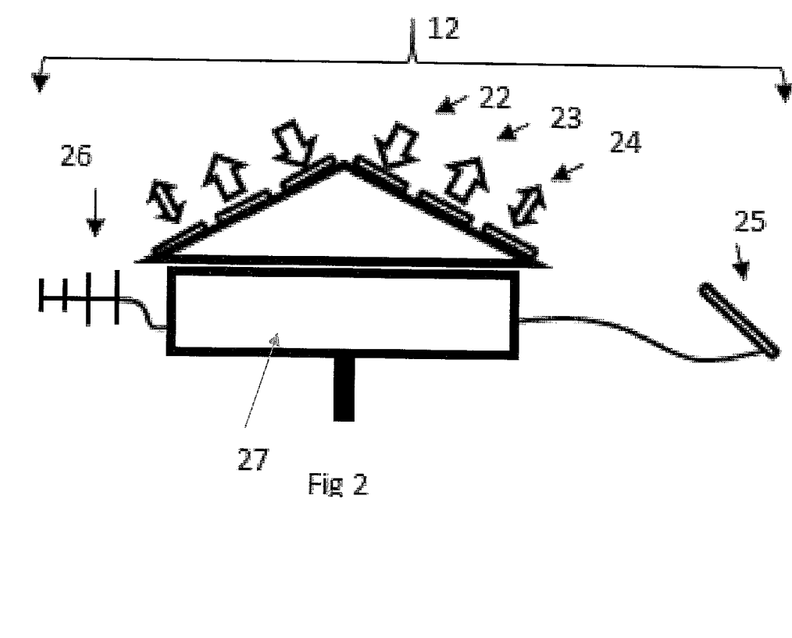

FIG. 2 shows some sensor elements as receive-only passive sensors illustrated with incoming arrows (22). Passive sensors can use various forms of incoming energy either directly from a drone or by way of reflection from other energy sources such as coming from a radio transmitter or a radar. The bidirectional (24) and transmit (outgoing arrows) (23) elements are active sensors. As used herein, an "active sensor" is one where a form of energy is transmitted from the sensor, which then detects or identifies a reflection or return of the energy. For example, an active sensor may transmit acoustical, electromagnetic (EM), radiofrequency (RF), visible light, infrared light, or laser light energy.

The electronics control box (27) includes a processor, memory and control electronics for the sensor array. For remote locations, a battery and solar panel subsystem (25) can be added to allow unpowered sites to operate. An antenna (26) may be provided for communications external to the sensor array. This allows networking of multiple sensor platforms or communication with a central authority (100). Embodiments of the invention includes the steps of prioritizing certain sensors at certain times, to enhance signal detection and at the same time reduce computational load and electronic power requirements to match the sensor array conditions for remote, mobile, or powered sites.

In the sensor array (12), the sensor types can include but not limited to passive sensors (22) such as: acoustic (infra/audio/ultrasonic), optical, heat/thermal infrared, and wide range RF sensors. Passive sensors may detect drones directly from drone emissions such as acoustic, RF or thermal emission signature. Passive sensors may also used to detect drones by indirect methods. Indirect passive methods include radar, near infrared, multi-spectral imaging, RF passive detection where the drone reflects external EM, optical or other signals which originate from a source external to the system. Such signals are not present, or greatly reduced, where the sky or sensor view is clear. Signals which can reflect off of a drone may include radar, television or radio broadcast signals, Wi-Fi, ZigBee, ANT, Bluetooth, and/or cellular frequencies, which can all be used in passive sensing.

Also the sensor array can have a set of sensor types can include active sensors (23, 24) such as: sound (infra-acoustic/ultrasonic), optical (LIDAR and variations), heat/thermal infra-Red, wide range RF, active radar, low power Radar (UWB radar), light/laser curtain, RF active interrogation/detection, Wi-Fi, ZigBee, ANT, Bluetooth, and cellular frequency sensors. Active sensors emit energy such that the energy is reflected off of a drone and returns a detectable signal. One preferred example of an active sensor system is LIDAR.

Figure 3:
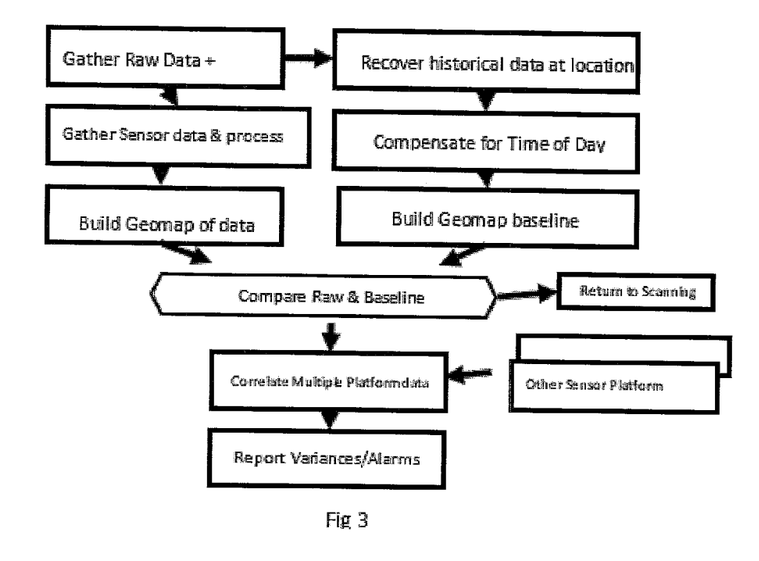
FIG. 3 shows a flowchart of drone detection processing based on live and historical data. Raw data is preprocessed to extract signatures or important characteristics. Previously gathered data is parameterized for location and time from the historical data and this is compared to the live data.

In some embodiments, the detection process is carried out by a number of steps rather than being a simple detection method. FIG. 3 illustrates one embodiment of drone detection processing based on live and historical data. Raw data is preprocessed to extract signatures or important characteristics of signals, example frequencies and power levels of RF sensing. This processing can be further enhanced by the use of artificial intelligence or machine learning. For example, a system may comprise a neural network which has been trained with templates or known signatures of drones. For example, samples of acoustical signatures of different types of drones or samples of RF channels used by drones may be used for such training purposes. Previously gathered data is parameterized for location and time from the historical data to produce a data baseline. Live data, collected in real-time, is then compared to the baseline. The detection is based on analysis of temporal data and signatures. Correlation with other sensor platforms, e.g. RF and Optical detection, is carried out as well to achieve higher data integrity and more accurate data results.

Therefore, in one aspect, a method of detection may comprise the following steps.

(a) Audit and log the existing (drone-less) environment for background signals for each sensor (acoustical, EM, IR, RF, and/or Radar). This may be done over an appropriate time scale, for example hours or days (24 hrs, 7 days, etc.)

(b) Build a 3D and/or directional model of the existing environment for each of the sensor arrays and sensing modalities. This model may then serve as the geographic and vector baseline of background signal for comparison and detection purposes.

(c) Use live sensor data and process it to produce potential signatures of drones and other signals indicative of the presence of a drone. For example, machine learning, neural network, or digital signal processing (Fast Fourier Transform etc.) techniques may be implemented to look for signatures of drones, which signatures is specific for each type of sensor employed in the sensor array. These signature signals may compared to the logged baseline to identify deviations from the baseline. These then are signals of interest which can be investigated further.

(d) Use high directivity sensors to localize possible drone location and enhance signal/signature analysis. Examples of high-directivity sensors include phased array antennas, telescopic visible and IR sensors, and directional sound processing sensors.

(e) After filtering and processing detailed sensor data determine if the signal is a potential drone.

The results from one sensor platform may be reinforced if similar results are obtained from another sensor platform, therefore results from multiple sensor platforms are correlated to increase localization resolution and positive detection probability. Also, triangulation with different sensor arrays may assist in locating the drone.

A communications module associated with the system may be configured to send notifications to an appropriate control centre or authority. The notification may be any form of communication, for example, an email, a telephone call, a text or SMS message or the like.

One aspect of the real world in which the drone detection system must work is that background signals will change over time. The system outlined above senses the incoming sensor data of a wide variation with respect to time. This can cause false positives at certain times of the day if fixed filtering and alarm thresholds are used. Thus, in some embodiments, a temporal aspect to the baseline signal processing is added. For example, in an airport the existing radar systems will have a time dependent sweep and signature. Plus the radar sweep will have a 3D and time based signature on a moment to moment basis. This knowledge can then be used to look for deviations on the time based signature. Passive detection of objects can be achieved by knowing that the time evolved radar reflection off of known baseline (permanent objects such as buildings etc.) is ignored and deviations from such a baseline (new reflections) will indicate the presence of new objects or conditions, potentially drones.

Figure 7:
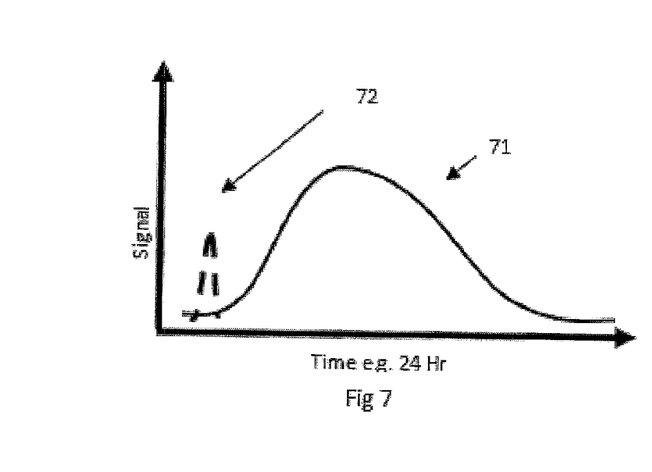
FIG. 7 shows a baseline for signals and a deviant signal over time. Example 24hrs.

FIG. 7 shows a baseline signal over a 24 hour period (71). This example represents background Wi-Fi activity at an airport. It also shows a signal deviating (72) from the baseline which could indicate a drone intrusion. In some embodiments, the database may comprise both fine grain (ie. seconds or minutes intervals) and coarse grain (minutes to hours) background signals in the database. This allows for very wide dynamic range of detection at the same time as mitigating false positives detection. In some embodiments, the signal can come from different modalities such as RF, visual, acoustical sensors, and from passive or active detection. Upon detection of a deviating signal, signal analysis and sensor array focus is employed to further examine the target. In the baseline example shown in FIG. 7, a background (scalar) level is shown, but in some embodiments, the system may be a directional (vector) or geolocation coordinate system with respect to the sensor array. Thus, in preferred embodiments, the database for the background signals may include amplitude, vector (directional) and temporal (time) information.

The recorded temporal data base can be used and enhanced with live data. For example known airplane take-off time information can be added to the processing to reduce extraneous signals which would otherwise contaminate the drone detection system with incoming sensor data. In addition the signatures (optical/acoustical/RF) of known events such as airplane take-off scan be stored by the system and used to determine non-threat sensor events.

For example, sound can have a baseline but this is subject to deviations and possible new sources of sound. Generalized sound detection will give one level of audit or data for the baseline. However a vector based (directional vector) sound baseline which includes directionality and time (time of day) will greatly enhance the detection of new sources of sound.

As used herein, a "geo-mapped" data set is one which includes absolute GNSS location and/or a vector of direction from a known GNSS location, and optionally, includes attributes such as RF signal strength or other sensor data associated with the Geo-mapped element.

Another example is detection of drone RF signals. A baseline of RF signals can be made and if a drone comes by there may be a deviation from the baseline, which may be the basis for sensor detection. However, the baseline will normally include many sources of RF, from cell phones to Wi-Fi to fixed and mobile platforms. Thus, in some embodiments, the baseline is mapped with the existing geo-mapped RF sources. For example, at an airport where the terminal is located on one side of the runway, it would be expected that many RF emissions will come from the direction of the terminal. These could be monitored in-situ and characterized statistically and then added to the drone detection baseline database. The sensor array once first placed can be set in a training or audit mode where it listens and logs the background baseline and possibly scans using active sensors its environment. This sensory data is gathered over an appropriate timeline (min/hr/day/week). This data is then used to build the normalized background signal level data base at that location.

Figure 4:
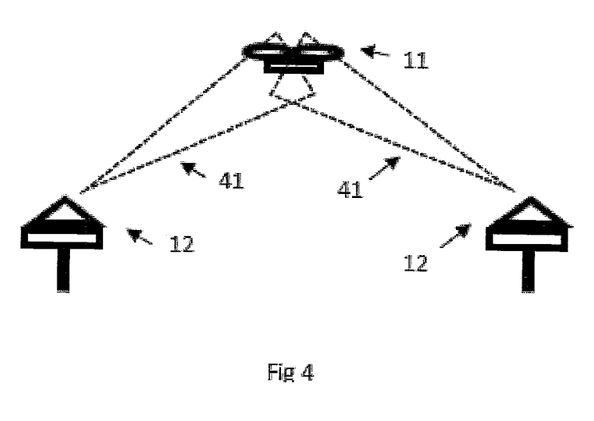
FIG. 4 shows two sensor arrays with EM, RF, Visible or other modality used in a high directional resolution mode. Correlation between these two sources enables better detection and better data with reduced false positives. GNSS is used to geo-locate and tag data for each sensor array.

FIG. 4 shows two sensor arrays (12), each with EM, RF, Visible or other modality which may be used in a high directional resolution mode (41). Correlation between these two sources enables better detection and better data with reduced false positives. In the simplest case, triangulation can be used to locate the drone (11). GNSS is used to geo-locate and tag data for each sensor array. Other methods such as the well-known pseudo-Doppler method programmed into the sensor array can give some vector of detection even with a single sensor array [22].

Figure 6:
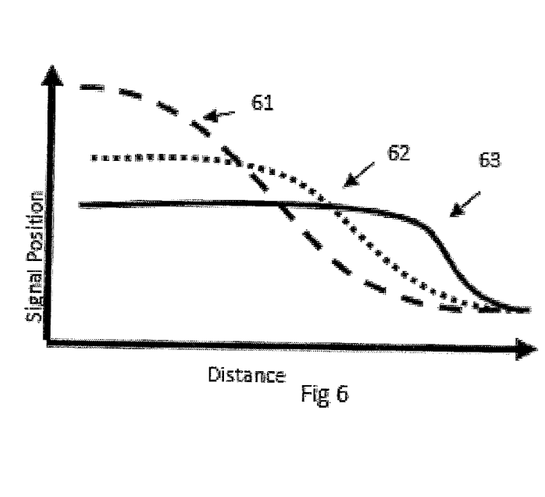
FIG. 6 shows for example a LIDAR versus Sound (Acoustical) versus RF detection comparing resolution and distance of detection. In this particular example at shorter distances the Lidar has superior resolution. However the resolution may be good enough for close in using acoustical detection which uses low power compared to LIDAR. RF is shown having the longest range. The choices between sensing modalities can be actively chosen for the best resolution, power and signal integrity (reduced false positives/reduced false negatives).

Combining different sensors allows for maximizing strengths of different modalities. For example, FIG. 6 shows LIDAR (61) versus Sound (62) (Acoustical) versus RF (63) detection comparing resolution and distance of detection. RF (63) has the longest range but lowest resolution. Thus, the system may implement a rank order which sensor set is better in different situations. Knowledge of this type is useful for dispatching or analyzing sensor data. In general, computation and power are limiting factors, and is especially so in remote locations such as a solar powered drone detection array. A ranking step may permit turning some sensors until needed (or entering a low-power standby mode) and saving power for the appropriate range of sensing. This is somewhat deterministic and therefore can be programmed in the search algorithm. Where sensors are in their sweet zone enhanced tracking and angular and geo-location can be determined.

Without rank ordering, the system can be swamped by noise and vast amounts of spurious sensor data, and false positives and false negatives may result. In this particular example at short distances the Lidar has superior resolution. However this is at the expanse of power. Passive acoustical sensing can be carried out at very low power. For mid to long distance the acoustical is superior to the Lidar (61). In a power constrained system one would utilize acoustic (62) until high resolution location is required at the expense of higher power. The choices between sensing modalities can be actively chosen for the best combination of resolution, power and signal integrity, thereby reducing the probability of a false positive or false negative result.

If continuous power is available at a site, the sensors may be turned on continuously. A mobile application will typically be power constrained as well necessitating power management over the sensors. AC power is not the only constraint for drone detection. Multiple high resolution sensors may become a data or computational overload and thus ranking the order of sensor modalities as shown in this invention is appropriate here as well.

In a preferred embodiment, the computation of RF emanations from the logged/audited direction (e.g. airport terminal) would be attenuated by some numerical factor in the calculation of detection baseline. RF emanations from other locations and directions would be considered at a higher numerical value. Thus, the system algorithm in general reduces the sensitivity from noisy areas or directions and is made more sensitive to quieter areas. This can lead to two positive outcomes. One is reduced false positive detection and the other is increase detection where warranted. Compare this to picking a fixed threshold which would could lead to false positives and negatives. As described above, there is also a time factor which can be added to the baseline information. For example, the terminal would be relatively quiet at night, compared to peak times. This information is either trained or programmed and therefore can be used to tune the baseline and alarm thresholds. Adding time based information allows flexibility in the baseline detection and enhances both detection and reduction of false positives. The coordination and attribution of the various baselines and sensitivities is crucial for successful drone detection.

Figure 5:
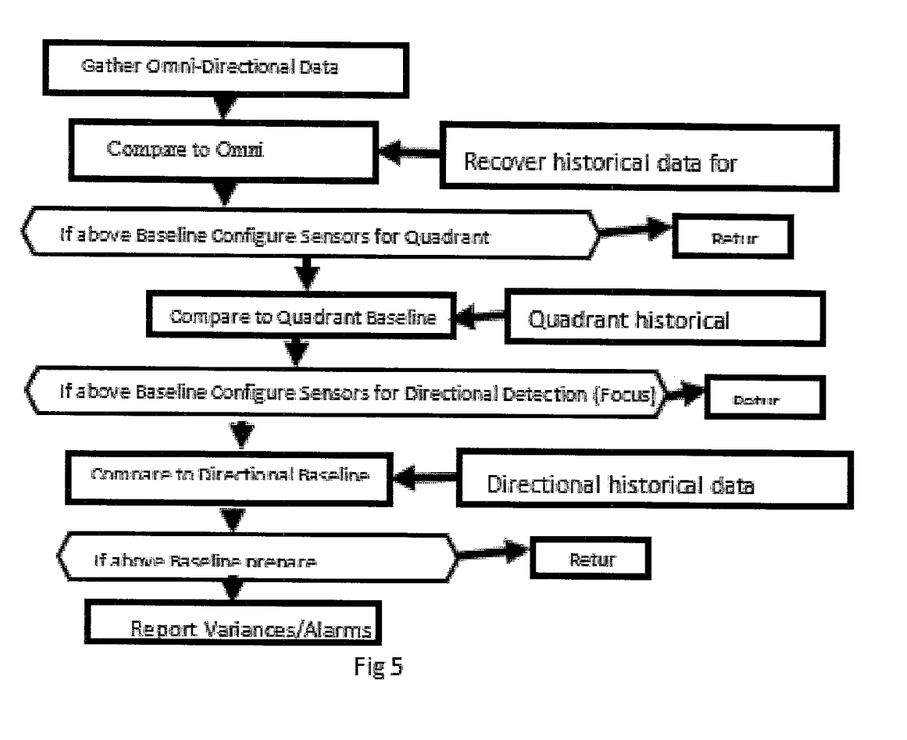
FIG. 5 shows increased sensitivity and direction (Geo-Location) which results from a sequence of detection resolutions. First Omni-directional then quadrant detection then pinpoint detection. Each step provides increased resolution and false positive rejection.

FIG. 5 shows a flow chart outlining a method for increased sensitivity and implementing directional information (geo-location). The sensitivity increases result from a sequence of detection resolutions shown in the flow chart. The sensing steps cascade from an initial sweep, where omni-directional sensing is performed, followed by quadrant detection, then finally pinpoint detection. Each step provides increased resolution and false positive rejection. The reason for hierarchy is that each sensor modality does not or cannot scan a 360 degree area with high resolution all the time. As well, high resolution scanning in some modalities may be slower than desired. A hierarchy of sensing allows for limited resources to be focused on appropriate signals resulting in reduced computational load and faster overall detection. This focus does not preclude continuous scanning of some low power and fast highly directional sensors. However some types of sensors when scanning at their highest resolution is power and computationally expensive, and further adds latency or lack of coverage because of sensor setup lag and duty cycle and computational load. Not every sensor set can have unlimited computational resources attached to it. Otherwise the system would not be economically viable or viable for remote unpowered sites. For a power constrained situation a hierarchy of selected sensing is a valuable added feature in this invention.

In some embodiments, in addition to the baseline (71), the system may include signal processing of signatures to help identify threats. For example, a smartphone Wi-Fi signal may be identical to a drone Wi-Fi, however the drone will have a Doppler factor encoded in the RF which will be different than that of a person holding a smart phone. Thus a Doppler sensitive RF signature can help discriminate signals. The Wi-Fi signals will also have a geographic or directional aspect as in the example of an airport terminal and a fixed sensor array. This information can then can be used to define a signature of interest. Thus, in a preferred embodiment, both the Doppler and directionality of a Wi-Fi can be used to determine if a detected Wi-Fi signal represents a threat or not.

Another example is the audible sound of a drone which may represent a signature distinguishable from background and other sounds. The database may include information about both threat and non-threat signatures. Auditory signals may be processed using analogous methods and systems described in U.S. Pat. No. 10,236,018 entitled "Systems and Methods for Detection of a Target Sound", and if permitted, the entire contents of which are incorporated herein by reference.

In preferred embodiments, the system implements a data reduction step in order to create a sensitive yet accurate system while using multiple sensors. A potentially huge volume of data will be coming from different sensors (RF, optical, sound), and preferably needs to be reduced, ultimately to a yes/no on drone detection. In these methods, preprocessing is preferred, as well as a hierarchy of data through to decisions and actions. The previously mentioned adaptive time and location based database and thresholds may be applied for achieving data reduction and enabling decision making at a level higher than the raw sensor data. The inputs of historical data (time, direction, location, and signature) and live data (direction, location, and signature) are compared. Ideally two or more sensor arrays are deployed as in FIG. 4. When two or more sensor arrays are deployed, improvement in detection can be achieved by correlating the data between two sensor array outputs (41). This is especially effective when the vector and signature of a potential threat are correlated. This higher level processing of multiple sensor arrays is contemplated in this invention.

It is desirable to have both sensors as compact as possible. U.S. Pat. No. 4,825,223 describes a physical embodiment of the Huygens principle for achieving a narrow beam of microwave energy. Such a mechanical structure is thin in the forward direction. If mounted on an azimuth/elevation articulated sensor array, it can provide pinpoint directionality for RF signals. The fixed structural steps can be replaced by variable delays for both transmit and receive signals and as well by individual antenna elements rather than reflective surfaces. This provides an electronically controlled steerable beam, a so called phased array. Reducing the physical thickness of an antenna can be achieved several ways. Reference (21) shows how to create wide frequency planar antennas. These can be implemented in electronic hardware to provide a narrow steerable beam as shown in FIG. 4 (41). The ability to 'look' in different directions provides the sensor array with flexibility and speed and is a clear advantage over omni-directional drone detection systems.

For optical/IR/thermal systems, such phased array techniques are not practical, however, multiple staring arrays of sensors can be used. Alternatively or in addition, azimuth/elevation articulated sensors and lenses may be used in the sensor array to enable long range and high resolution optical/IR/thermal detection.

Signals may be enhanced with beamed, phased, or focused signals (41). With respect to FIG. 4 increased angular resolution and increased signal power can be delivered to a target for the case of active drone detection. Beam enhancement for both transmit and receive paths can be achieved by proper phasing of the Transmit (Tx) (23, 24) and Receive (Rx) (22, 24) signals. An array of multiple receiving sensors will produce a multiple of the signal from the target. The combination is more effective than a single sensor. Beaming can be achieved for both passive (22) and active (22, 23, 24) modalities depending on the underlying physics.

U.S. Pat. No. 10,236,018 teaches a method of acoustical direction finding using 3 microphones with reduced signal processing requirements. In embodiments of the present invention, similar techniques could be used to find the direction of a drone. Such methods include: template matching, FFT techniques, etc. Other well known methods of acoustical processing are known which may be advantageously utilized when implemented in conjunction with the current invention, such as template matching against the spectral signature of known drones.

In preferred embodiments, the sensor array has multiple sensors, permitting both omnidirectional and focused direction sensing, without changing the sensors. For example, the equivalent of an omnidirectional acoustic sensor can be achieved by simply summing individual acoustical sensors. Quadrants and focused beams can be optioned by time shifting the incoming signals within a computational processor. Such processing can be achieve by microcontrollers, DSPs, or GPUs etc. depending on the computational load and the data throughput requirements. The same or similar concept may be implementd for other kinds of sensors such as RF and optical sensors.

It is obvious that when used at an airport the system is ideally not sending EM or Laser energy where it is prohibited. The sensor array can be programed to be mostly passive in this case. Depending on the location of the sensor array the active sensors such as LIDAR or radar can be constrained to specific quadrants or sectors. This flexibility increases detection possibility while keeping things safe. One factor about airports is that the system must be able to separate drones from legal flight platforms such as small planes. In this case the system will filter for attributes to prevent false detection for example for small aircraft. This can be done at the sensor level or a at a higher level using signature analysis. Known flight patterns of authorized aircraft may be identified in the baseline database.

There are several methods to achieve calculation of the direction vector and speed of a sensed drone, such as by using pseudo Doppler (22). Speed and directional vector is useful information to be sent to the appropriate authority. Differential LIDAR, where two shots of location of an identified object are taken, can be used to calculate direction and speed. There is also directional Lidar for direct Doppler detection. Doppler Effect using RF or Sound signatures can be used to estimate directional vector. The best resolution will be achieved when more than one sensor platforms (11) are active. This can give high resolution triangulation data. It is important therefor to network the sensor array platforms either in a peer-to-peer (wireless) network or in a tree network where information can travel to a computational center or a distributed one such as cloud based computing.

Embodiments of the present invention may create a more robust detection system than prior art which depends on a limited set of sensing modalities. This system allows for disparate sensor data to be combined where coverage is less than 100%. 100% multiplatform sensor coverage is probably not possible because it depends on ideal conditions. For example a drone detection can be achieved by say Lidar from one sensor platform while a second one (further away) can only detect sound above threshold. The value of the different platform detections can be used to localize or increase correct detection (reduce false positives and negatives) by the assessment of both sensor modalities from two geographically different sensor platforms. In this way, drones can be detected and localized even on partial information. Thus the power of the sensor network is used to increase sensitivity, range, and signal quality. A ranking and voting system can be one method to process such information. In this way, a parameter such as percent of probability or percent of quality can be communicated along with the determined drone location information. Partial coverage is what every sensor system will have with respect to changing conditions and physical limits of distance of sensing. This system shows how one can use partial data from various sensors to heal weaknesses, fill gaps in information and provide good detection over that of previous techniques.

The term Graphical User Interface (GUI) is used generically herein. A simple implementation may be a map of the local facility, a plan view, with added drone detection locations. Each can map on to visual or operational clues such as drone direction/height/Speed and % of quality of detection as mentioned above. Data can then be given to the appropriate authority on real-time basis.

With increased signal to noise and signal fidelity made possible by this invention enhanced techniques for drone and determination can be achieved. This enables automatic recognition and annotation of features for the operator and the 3D Geometric drone location information to be provided.

The computer (80) may run software which operates the device, by controlling the NDT testing system and collecting the test data, and, optionally, controlling the motion control and drive systems. As shown in FIG. 7, system (100) may be representative of the computing device (80). The system (100) may include one or more processors (101) for executing instructions. Processors suitable for the execution of instructions include, by way of example, both general and special purpose microprocessors, and any one or more processors of any kind of digital computer. System (100) may also include one or more input/output (I/O) devices (102), which may include physical keyboards, virtual touch-screen keyboards, mice, joysticks, styluses, etc. Moreover, I/O devices (102) may include loudspeakers, handset speakers, microphones, cameras, or sensors such as accelerometers, temperature sensors, or photo/light sensors.

Figure 8:
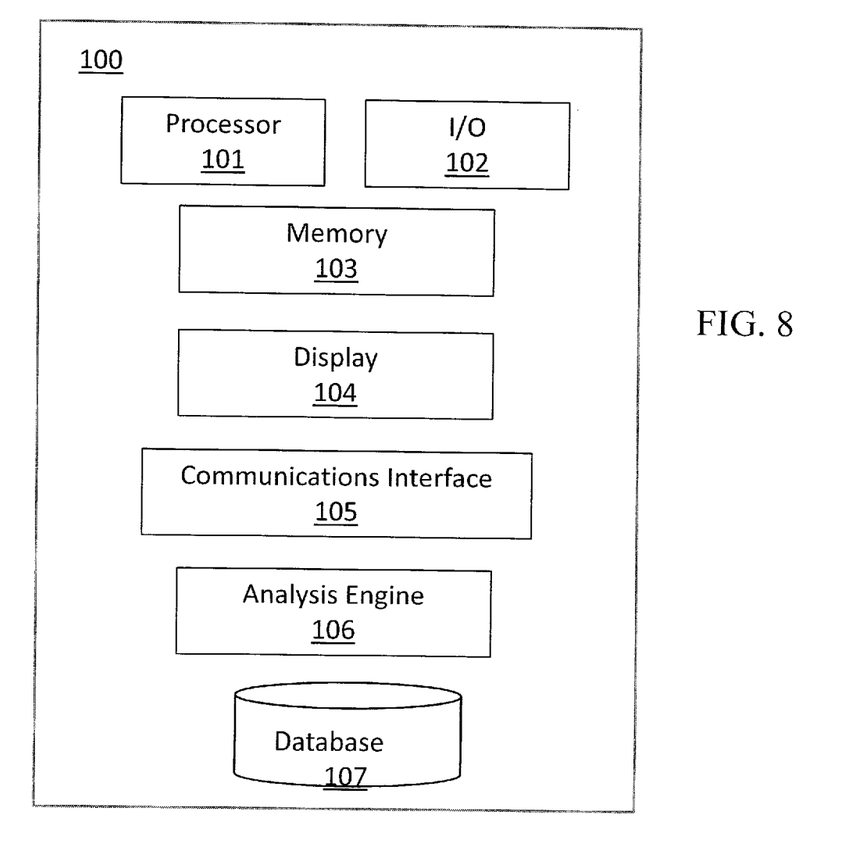
FIG. 8 illustrates an exemplary central authority comprising a computing system for processing signals received from one or more sensor arrays and for comparing signals received with a baseline to determine if a deviance exists.

As further illustrated in FIG. 8, a central authority (100) may comprise a computing system include one or more storage devices configured to store data and/or software instructions used by the one or more processors (101) to perform operations consistent with disclosed aspects and embodiments herein. For example, system (100) may include a memory (103) configured to store one or more software programs that is executed by the one or more processors (101) to perform functions or operations. By way of example, memory (103) may include NOR or NAND flash memory devices, Read Only Memory (ROM) devices, Random Access Memory (RAM) devices, etc. Memory (103) may also include storage mediums such as, for example, hard drives, solid state drives, tape drives, RAID arrays, etc. Although FIG. 7 shows only one memory (103), system may include any number of memories. Memory (103) may be located remotely and system (100) may be able to access memory (103) via a network.

System (100) may also include one or more displays (104) for displaying data and information, such as with a Graphical User Interface. Display (104) may be implemented using devices or technology, such as a cathode ray tube (CRT) display, a liquid crystal display (LCD), a plasma display, a light emitting diode (LED) display, a touch screen type display such as capacitive or resistive touchscreens, and/or any other type of display known in the art.

System (100) may also include one or more communications interfaces (105). Communications interface (105) may allow software and data to be transferred between the system (100) and each of the sensor arrays, as well as remote computers or servers. Examples of communications interface (105) may include a modem, a wired or wireless communications interface (e.g., an Ethernet, Wi-Fi, Bluetooth, Near Field Communication, WiMAX, WAN, LAN, etc.), a communications port (e.g., USB, IEEE 1394, DisplayPort, DVI, HDMI, VGA, Serial port, etc.), a PCMCIA slot and card, etc. Communications interface (105) may transfer software and data in the form of signals, which may be electronic, electromagnetic, optical, or other signals capable of being received by communications interface (105). These signals may be provided to communications interface (105) via a communications path (not shown), which may be implemented using wireless, wire, cable, fiber optics, radio frequency ("RF") link, and/or other communications channels.

System (100) may include an analysis engine (106). By way of example, analysis engine (106) may be configured to summarize and manipulate the sensor data in accordance with the methods described herein. In some embodiments, analysis engine (106) may be implemented as at least one hardware module configured to execute the functions described herein. Alternatively, processor (101) may be configured to execute the functions of the analysis engine (106). For example, processor (101) may communicate with memory (103) that includes components of the analysis engine (106) in the form of computer-executable instructions, such that processor (101) may then execute these instructions. As another example, the functions of the analysis engine may be included in processor (101) itself, such that processor (101) is configured to implement these functions.

Database (107) may be used to store baseline data, templates or signatures, and any associated data, such as time, geolocation, and the like.

Definitions and Interpretation

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

REFERENCES

The following references are indicative of the level of skill in the art, and are incorporated herein by reference as if fully reproduced herein.
(1) U.S. Pat. No. 4,825,223 Moore. Planar antenna
(2) United States Patent Application 20180261237 Moore . . . Acoustical direction . . .
(3) U.S. Pat. No. 10,101,196 Naguib. Acoustical signature drone detection
(4) U.S. Pat. No. 9,651,649 Salloum. Passive acoustic pair wise detection
(5) U.S. Pat. No. 10,084,960 Pettegrew. Panoramic view imaging
(6) US Patent application 20170148467A1 (Franklin)

OTHER REFERENCES

Robust Speech Recognition using Microphone Arrays, I. A. McCowan, PhD Thesis, Queensland University of Technology, Australia, 2001.

A resistively loaded, printed circuit, electrically short dipole element for wideband array applications, R. E. Clapp, IEEE Antennas and Propagation Society Int. Symp. Digest, vol. 1, 1993, pp. 478-481.
Radio Direction Finding Network Receiver Design For Low-Cost Public Service Apps, Stieber, MSc Thesis Cal Poly. December 2012

The invention claimed is:

1. A method for detection of an aerial drone in an environment, the method comprising the steps of:
(a) building a baseline of geo-mapped sensor data in a temporal and location indexed database by:
(i) using at least one sensor to receive signals from the environment and converting into digital signals for further processing;
(ii) deriving time delays, object signatures, Doppler shifts, reflectivity, and/or optical characteristics from the received signals;
(iii) geo-mapping the environment using GNSS and the sensor data; and
(iv) logging sensor data over a time interval;
(b) gathering live sensor data and computing at least one parameter and derive appropriate signature data;
(c) comparing the live processed data to the baseline data to identify a variance, if any;
(d) identifying and/or locating a drone if the variance is greater than a pre-determined threshold;
wherein live sensor data is first gathered omnidirectionally, and, upon a possible drone identification event, narrowing the sensor data to a quadrant or sector containing the possible drone, and using a more sensitive sensor or data processing method, confirm the drone identification event.

2. The method of claim 1 wherein the sensor data is narrowed first to a quadrant or sector, and then to a narrower range containing the possible drone.

3. The method of claim 1 wherein the at least one sensor comprises a combination of passive and active sensors.

4. The method of claim 1 wherein the at least one parameter comprises direction and signal strength.

5. The method of claim 1 wherein the time interval is 24 hours to 7 days.

6. A system of for detection of an aerial drone in an environment, the system comprising a memory device that stores a set of instructions and at least one processor in communication with the memory for executing the instructions to a method comprising the steps of:
(a) building a baseline of geo-mapped sensor data in a temporal and location indexed database by:
(i) using at least one sensor to receive signals from the environment and converting into digital signals for further processing;
(ii) deriving time delays, object signatures, Doppler shifts, reflectivity, and/or optical characteristics from the received signals;
(iii) geo-mapping the environment using GNSS and the sensor data; and
(iv) logging sensor data over a time interval;
(b) gathering live sensor data and computing at least one parameter such as direction and and derive appropriate signature data;
(c) comparing the live processed data to the baseline data to identify a variance, if any;
(d) identifying and/or locating a drone if the variance is greater than a pre-determined threshold;
(e) wherein live sensor data is first gathered omnidirectionally, and, upon a possible drone identification event, narrowing the sensor data to a quadrant or sector containing the possible drone, and using a more sensitive sensor or data processing method, confirm the drone identification event.

7. The system of claim 6 wherein the at least one parameter comprises direction and signal strength.

8. The system of claim 6 wherein the time interval is 24 hours to 7 days.

9. The system of claim 6 wherein the at least one sensor comprises a combination of passive and active sensors.

\* \* \* \* \*